(12) United States Patent
Kishishita et al.

(10) Patent No.: US 6,625,858 B2
(45) Date of Patent: Sep. 30, 2003

(54) METHOD OF PRODUCING STATOR OF VARIABLE CAPACITOR

(75) Inventors: Hiroyuki Kishishita, Fukui-ken (JP); Hidetoshi Kita, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 307 days.

(21) Appl. No.: 09/778,188

(22) Filed: Feb. 7, 2001

(65) Prior Publication Data

US 2001/0018789 A1 Sep. 6, 2001

(30) Foreign Application Priority Data

Feb. 8, 2000 (JP) ........................................ 2000-030082

(51) Int. Cl.$^7$ ................................................ H01G 7/00
(52) U.S. Cl. .................... 29/25.42; 29/831; 29/832; 29/846; 29/847; 451/41
(58) Field of Search ..................... 29/831, 832, 846, 29/852, 854, 596, 598, 25.41, 25.42, 847; 310/43, 309; 361/277, 278, 298.1, 287, 290; 174/255, 260, 261; 264/109; 427/104; 451/41, 29; 156/89.12, 89.16, 153, 154

(56) References Cited

U.S. PATENT DOCUMENTS

| | | | | |
|---|---|---|---|---|
| 3,681,828 A | * | 8/1972 | Mezey ...................... 29/25.42 |
| 3,694,710 A | * | 9/1972 | Kirschner ................... 317/261 |
| 3,705,335 A | * | 12/1972 | Metzger ................. 317/249 R |
| 4,181,923 A | * | 1/1980 | Tatsumi ....................... 361/293 |
| 4,292,660 A | * | 9/1981 | Tatsumi ....................... 361/293 |
| 4,500,941 A | * | 2/1985 | Izumi ........................... 361/293 |
| 5,034,851 A | * | 7/1991 | Monsorno ................... 361/321 |
| 5,414,589 A | * | 5/1995 | Amano ..................... 361/306.3 |
| 5,424,906 A | | 6/1995 | Kishishita et al. |
| 5,554,906 A | * | 9/1996 | Takagi ......................... 310/323 |
| 6,134,097 A | * | 10/2000 | Shibata ..................... 361/298.1 |
| 6,229,098 B1 | * | 5/2001 | Dunn ........................... 174/260 |

FOREIGN PATENT DOCUMENTS

| | | |
|---|---|---|
| JP | 4-321210 | 11/1992 |
| JP | 10-303071 | 11/1998 |
| JP | 11-087173 | 3/1999 |

\* cited by examiner

*Primary Examiner*—Peter Vo
*Assistant Examiner*—Tai Nguyen
(74) *Attorney, Agent, or Firm*—Keating & Bennett, LLP

(57) ABSTRACT

A method for producing a stator for use in a variable capacitor includes providing a stator having a protruded portion provided on a first main surface of a stator component such that the top surface of the protruded portion has a height greater than the thickness of each of conductive films disposed thereon. The method also includes polishing the first main surface of the stator component using the top surface of the protruded portion as a reference.

15 Claims, 5 Drawing Sheets

METHOD OF PRODUCING STATOR OF VARIABLE CAPACITOR

BACKGROUND OF THE INVENTION

1. Field of the Invention

The present invention relates to a method of producing a stator for a variable capacitor, and more particularly, to a method of producing the stator including a polishing step. Further, the present invention relates to a variable capacitor including the stator produced by the above-described production method.

2. Description of the Related Art

A conventional variable capacitor is described in Japanese Unexamined Patent Publication Application No. 11-87173. FIGS. 4 to 6 show the variable capacitor described in this Unexamined Patent Publication Application No. 11-87173.

FIG. 4 is a perspective view of a variable capacitor 1. FIG. 5 is a perspective view of the variable capacitor 1 of FIG. 4, taken from below the variable capacitor 1. FIG. 6 is a cross-sectional view of the variable capacitor 1 shown in FIG. 4.

The variable capacitor 1 includes a stator 2, a rotor 3, and a cover 4 which define the capacitor 1.

In particular, the stator 2 is made of a ceramic dielectric, and has first and second main surfaces 21 and 22 which are parallel to each other, and a side surface 23 connecting the first and second main surfaces 21 and 22. Moreover, stator electrodes 5 and 6 are arranged inside of the stator 2 to extend parallel to the first and second main surfaces 21 and 22, respectively. Stator terminals 7 and 8 are made of conductive films and extend on a portion of the side surface 23, and more particularly, on the outer end-surfaces of the stator.

The two stator electrodes 5 and 6 and the two stator terminals 7 and 8 are provided as described above, such that the structure of the stator 2 is symmetrical, and accordingly, it is unnecessary to consider the direction of the stator 2 when the variable capacitor 1 is produced. In the capacitor 1 illustrated in FIGS. 4 and 6, the stator electrode 5 and the stator terminal 7 operate, while the stator electrode 6 and the stator terminal 8 do not operate.

On the main surface 22 of the stator 2, a rib 9 is arranged to extend longitudinally through the approximate center portion of the main surface 22.

The rotor 3 is made of conductive metal, and is provided on the first main surface 21 of the above-described stator 2. On the underside of the rotor 3, a substantially half-circular rotor electrode 11 with a protuberant step-portion is provided. Moreover, on the underside of the rotor 3, a protuberance 12 having the same height as the rotor electrode 11 is provided, and inclination of the rotor 2 is prevented due to the present of the rotor electrode 11. The rotor 3 is provided with a driver recess 13 to receive a tool, such as a driver or other suitable tool with which the rotor 3 is rotation-operated.

The cover 4 is made of conductive metal, receives the rotor 3, and is fixed to the stator 2. The rotor 3 is held by the cover 4 and is rotatable with respect to the stator 2.

In the cover 4, an adjustment hole 14 is provided to expose the driver recess 13 of the rotor 3. In the periphery of the adjustment hole 14, a spring action portion 15 is provided which is in contact with the rotor 3 and presses the rotor 3 against the stator 2. The spring action portion 15 is inclined downwardly at the periphery of the adjustment hole 14, toward the center of the adjustment hole 14, and moreover, is provided with a plurality of protuberances 16.

Moreover, the cover 4 is provided with engagement pieces 17 and 18 extending downward in opposition to each other. The engagement pieces 17 and 18 are bent to engage with the main surface 22 of the stator 2, and thereby, the cover 4 is fixed to the stator 2. The above-described rib 9 provided for the stator 2 protrudes the same amount as the engagement pieces 17 and 18 bent onto and along the second main surface 22 of the stator 2, such that the variable capacitor 1 is stably and securely mounted on an appropriate wiring substrate (not shown).

Furthermore, on the cover 4, a rotor terminal 19 is provided and extends downward.

In the variable capacitor 1 having the above-described structure, the rotor electrode 11, which is in contact with the first main surface 21 of the stator 2, is opposed to the stator electrode 5 via a portion of the ceramic dielectric defining the stator 2, and thereby, a static capacity is produced. The rotor 3 is rotationally operated to vary the effective opposition area of the rotor electrode 11 opposed to the stator electrode 5 to change the static capacity. The adjusted static capacity is drawn between the stator terminal 7 electrically connected to the stator electrode 5 and the rotor terminal 19 provided on the cover 4 in contact with the rotor 3 having the rotor electrode 11 provided thereon.

In the above variable capacitor 1, to increase the maximum static capacity and obtain a stable static capacity, the first main surface 21 of the stator 2 is polished such that the thickness of the dielectric between the main surface 21 and the stator electrodes 5 and 6 is reduced, and the main surface 21 in contact with the rotor electrode 11 is smoother.

Moreover, the first main surface 21 of the stator 2 is polished for the following additional purpose.

The conductive films defining the above-described stator terminals 7 and 8 are formed, e.g. by dipping the respective end portions of the stator 2 into a bath including a conductive paste having a desired thickness to apply the conductive paste to the respective end portions of the stator 2, and then, baking the paste. Thus, the conductive films are provided not only on the side surface 23 of the stator 2, but also extend from the side surfaces 23 onto a portion of the first and second main surfaces 21 and 22.

However, in the variable capacitor 1, as shown in FIGS. 4 and 6, the stator terminals 7 and 8 do not extend on the first main surface 21 of the stator 2. Thus, to obtain this configuration of the stator terminals 7 and 8, after the conductive films are formed as described above, the first main surface 21 of the stator 2 is polished such that the conductive films on the first main surface 21 are removed.

The upper ends of the stator terminals 7 and 8 can be positioned at a relatively large distance from the edge of the cover 4 or the peripheral surface of the rotor 3 by preventing the formation of the stator terminals 7 and 8 on the first main surface 21 of the stator 2 as described above.

Accordingly, if an error in positioning of the rotor 3 and the cover 4 with respect to the stator 2 occurs when the variable capacitor 1 is produced, or a deviation in position of the cover 4 and the rotor 3 is generated when the rotor 3 is rotated, short-circuiting and deficient withstand voltage will not occur between the edge of the cover 4 and the upper end portions of the respective stator terminals 7 and 8, or between the peripheral surface of the rotor 3 and the upper end portions of the respective stator terminals 7 and 8.

When the first main surface 21 of the above-described stator 21 is polished, conventionally, the plurality of stators 2 are simultaneously processed to improve the efficiency of the polishing process.

FIGS. 7A to 7D illustrate a conventional polishing method used to achieve the above-described polishing. It should be noted that FIGS. 7A to 7D are also used for illustration of the problems to be solved by the present invention, as described later.

FIGS. 7A to 7D schematically show the stators 2 shown in FIGS. 4 to 6, and the elements in FIG. 7 corresponding to those in FIGS. 4 to 6 are designated by the same reference numerals. Moreover, stator components defining the stators 2 are designated by reference numeral 2a in FIG. 7.

The plurality of stator components 2a are prepared as shown in FIG. 7A. In each of the stator components 2a, the stator terminals 7 and 8 made of conductive films are arranged to extend from the side surface 23 onto a portion of the respective first and second main surfaces 21 and 22.

The plurality of stator components 2a are supported on the holding surface 26 of the holder 25 as shown in FIG. 7B. Each of the stator components 2a is positioned such that the second main surface faces the holding surface 26. To fix each of the stator components 2a to the holding surface 26, pressure-sensitive adhesion is applied.

Next, the first main surfaces 21 of the plurality of stator components 2a, while the components 2a are supported by the holder 26, are polished by a polishing plate 27, as sequentially illustrated in FIGS. 7B and 7C.

FIG. 7D shows the plurality of stators 2 obtained by polishing the stator components 2a.

However, in the above-described polishing method, as shown in FIG. 7D, in some instances, the plurality of stators 2 have different thicknesses between the first main surfaces 21 and the stator electrodes 5 and 6. This causes variations in maximum static capacity of the variable capacitors 1.

The above-described variations are caused by the variations in thickness of the stators 7 and 8. In particular, as shown in FIG. 7B, the plurality of stator components 2a are supported by the holder 25 while the stator terminals 7 and 8 are in contact with the flat holding surface 26. Accordingly, the differences in thickness between the conductive films defining the stator terminals 7 and 8 cause differences between the positions of the first main surfaces 21 of the stator components 2a. As a result, in the plurality of stators 2 obtained by polishing the stator portions 2a with the polishing plate 27, variations in thickness between the first main surfaces 21 and the stator electrodes 5 and 6 occur.

Moreover, as shown in FIGS. 7A to 7D, when the conductive films defining the stator terminals 7 and 8 are excessively thin, as shown in the stator component 2a or stator 2 which is the second from the left side of the arranged components or stators, the polishing plate 27 does not contact the first main surface 21 of the stator component 2a, shown in FIG. 7C. Therefore, in some cases, the stator terminals 7 and 9 on the first main surface 21 are not completely removed, as shown in FIG. 7D.

Moreover, according to the polishing method illustrated in FIGS. 7A to 7D, if there is a difference in thickness between the conductive films of the two stator terminals 7 and 8 of each stator components 2a, the component 2a encounters the problem illustrated in FIGS. 8A and 8B. FIGS. 8A and 8B correspond to FIGS. 7C and 7D, respectively.

As shown in FIG. 8A, if the conductive film for constituting the stator terminal 7 is thinner than that for constituting the stator terminal 8, the stator portion 2a is held in an inclined posture on the holding surface 26 of the holder 25. Accordingly, the stator portion 2a is polished by means of the polishing plate 27 while the portion 2a is in this inclined posture.

As a result, in the produced stator 2, the first main surface 21 formed by polishing is not parallel to the second main surface 22, and similarly, is not parallel to the stator electrodes 5 and 6, as shown in FIG. 8B.

If the above-described stator 2 is used in the variable capacitor 1, the rotor 3 does not rotate stably, and moreover, the static capacity is unstable.

SUMMARY OF THE INVENTION

To overcome the above-described problems with the prior art, preferred embodiments of the present invention provide a method of producing a stator of a variable capacitor, and a variable capacitor including the stator produced in the production method.

The method of producing a stator of a variable capacitor in accordance with preferred embodiments of the present invention includes the steps of preparing the stator for use in the variable capacitor which is made of a dielectric, has first and second main surfaces which are parallel to each other, and a side surface connecting both of the first and second main surfaces, the stator provided with a stator electrode extending in parallel to the first and second main surfaces, the stator electrode arranged opposite a rotor electrode provided on a rotor through at least a portion of the dielectric, the rotor electrode rotatably supported in contact with the first main surface, and a stator terminal provided on at least a portion of the side surface to be electrically connected to the stator electrode, preparing a stator component which defines the stator and is provided with the stator electrode and the stator terminal, the stator terminal being made of a conductive film and extending from the side surface onto a portion of the respective first and second main surfaces, and a protruded portion provided on the first main surface where the conductive film defining the stator terminal is not provided, the protruded portion being provided such that the height at the top surface of the protruded portion is greater than the thickness of the conductive film, and polishing the first main surface of the stator component having the top surface of the protruded portion as a reference to remove the portion of the conductive film extending on the first main surface.

Preferably, the above-described step of polishing includes the steps of holding the plural stator components with a holder to arrange the top surfaces of the protruded portions on the same plane; and polishing the first main surface of the stator components while the plural stator components are held by the holder.

More preferably, the step of holding the plural stator components with the holder includes the steps of preparing an arrangement member having a flat arrangement surface, arranging the plural stator components using the arrangement member with the top surfaces of the protruded portions being in contact with the arrangement surface of the arrangement member, preparing a polishing fixing agent to fix the stator components to the holder, and fixing the second main surfaces of the plural stator components to the holder through the polishing fixing agent.

Particularly, the method of producing a stator for use in a variable capacitor in accordance with the present invention is advantageously applied when the stator has the stator electrode provided inside the dielectric.

Moreover, the method of producing a stator for use in a variable capacitor in accordance with the present invention is advantageously applied when the conductive film defining the stator terminal is formed by applying conductive paste to extend from the side surface onto a portion of the respective first and second main surfaces, and then baking the paste.

Moreover, the present invention is intended for a variable capacitor including the stator produced in the above-described method.

Other features, elements, characteristics and advantages of the present invention will become more apparent from the detailed description of preferred embodiments thereof with reference to the drawings.

DETAILED DESCRIPTION OF PREFERRED EMBODIMENTS

Figure 1A:
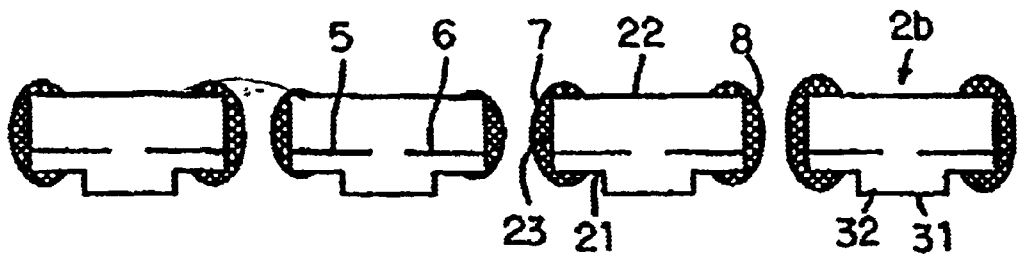
FIGS. 1A to 1D sequentially illustrate processes provided in a method of producing a stator according to a preferred embodiment of the present invention.

Hereinafter, a method of producing a stator 2 for a variable capacitor 1 shown in FIGS. 4 to 6 will be described.

FIGS. 1A to 4D correspond to the above-described FIGS. 7A to 7D, and sequentially illustrate the steps included in the method of producing the stator 2 according to a preferred embodiment of the present invention. The elements shown in FIG. 1 and in relation to the stator 2 are designated by the same reference numerals as those used in FIGS. 4 to 6.

First, a plurality of stator components 2b are prepared as shown in FIG. 1A. The details of the stator components 2b are illustrated in the perspective view of FIG. 2.

Figure 2:
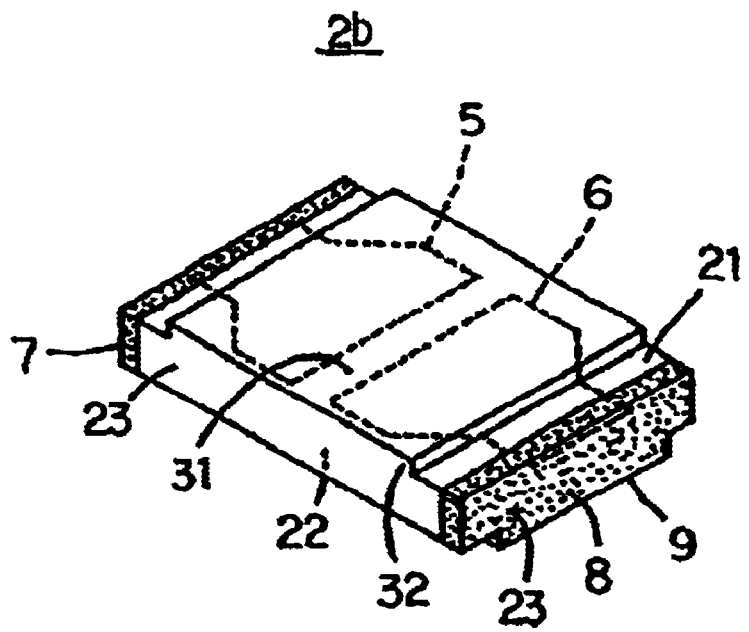
FIG. 2 is a perspective view showing the stator component 2b shown in FIG. 1A.

Referring mainly to FIG. 2, the stator components 2b are preferably made, e.g. of a ceramic dielectric, and are provided with the stator electrodes 5 and 6 and the stator terminals 7 and 8, respectively. The stator terminals 7 and 8 are preferably formed, e.g. by dipping the respective end portions of the stator component 2b into a bath including conductive paste with a desired thickness such that the conductive paste is applied to the respective end portions of the stator component 2b, and then baking the paste. Thus, the conductive films defining the stator terminals 7 and 8 are not only formed on a portion of the side surface 23, but extend from the side surface 23 onto a portion of the respective first and second main surfaces 21 and 22.

FIG. 1A shows the plurality of stator components 2b having variations in thickness of the conductive films defining the stator terminals 7 and 8. The variations in thickness of the stator terminals 7 and 8 are caused when the conductive films are formed by applying and baking the conductive paste as described above.

Referring to FIG. 2 again, a protruded portion 32 is provided on the first main surface 21 of the stator component 2b where the conductive films defining the stator terminals 7 and 8 are not provided. The protruded portion 32 is provided such that the height at the top surface 31 of the protruded portion 32 is greater than the thickness of the respective conductive films.

Figure 1B:
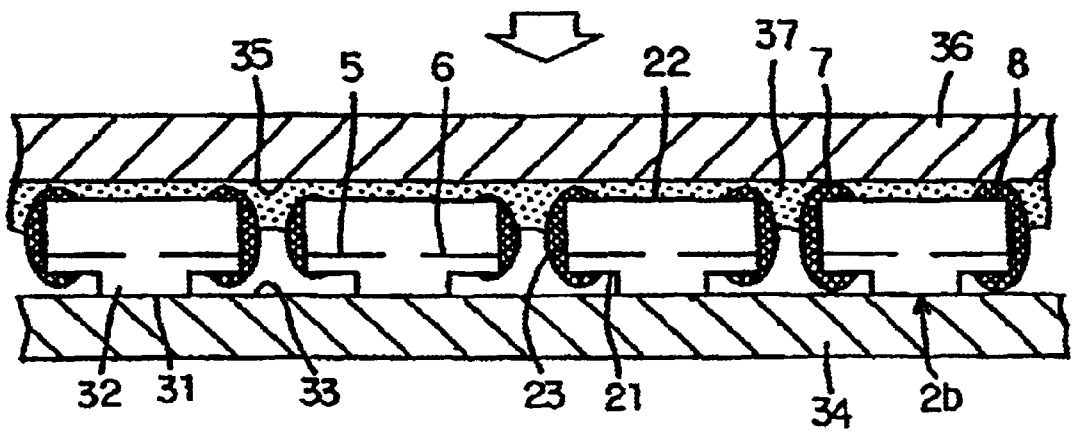

Then, as shown in FIG. 1B, the plurality of stator components 2b are positioned via the top surfaces 31 of the respective protruded portions 32 as a reference. More particularly, an arrangement member 34 having a flat arrangement surface 33 is provided. The plurality of stator components 2b are arranged on the arrangement surface 33 of the arrangement member 34 while the respective top surfaces 31 are in contact with the arrangement surface 33. Thus, the top surfaces 31 of the protruded portions 32 of the plurality of stator components 2b are arranged on the same plane. In this state, locations of the plurality of stator components 2b are fixed on the arrangement surface 33 by an adhesive or other suitable fixing agent.

In the above-described state, the height of the top surfaces 31 of the protruded portions 32 of the stator components 2b is greater than the thicknesses of the conductive films defining the stator terminals 7 and 8. Therefore, even if there are variations in thicknesses of the conductive films defining the stator terminals 7 and 8, the plurality of stator components 2b are accurately arranged, and not adversely affected by the variations.

The holder 36 is provided having a holding surface 35 to hold the second main surfaces 22 of the plurality of stator components 2b arranged as described above. Moreover, a polishing fixing agent 37 is provided to fix the respective stator components 2b to the holder 36.

Then, the second main surfaces 22 of the plural stator components 2b arranged with the arrangement member 34 are fixed to the holding surface 35 of the holder 36 via the polishing fixing agent 37. At this time, with the polishing fixing agent 37, the plural stator components 2b are fixed to the holder 36 with the top surfaces 31 of the respective protruded portions arranged on the same plane, even if variations in thickness of the stator terminals 7 and 8 of the stator parts 2b exists.

Any suitable fixing agent can be used for the polishing fixing agent 37.

First, as the polishing fixing agent 37, an agent may be used which is in the liquid state at a room temperature and is solidified when the agent is cooled to a temperature lower than room temperature, such as water and a low temperature coagulant. In this case, for fixing the stator components 2b to the holder 36, the polishing fixing agent 37 In the liquid state is interposed between the stator components 2b and the holder 36 at a room temperature (or above the room temperature), and then, the polishing fixing agent 37 is cooled to cause the polishing fixing agent 37 to solidify.

Secondly, as the polishing fixing agent 37, an agent which is in the solid state at room temperature and is liquefied when the agent is heated to a temperature higher than room temperature, such as wax and paraffin, may be used. In this case, to fix the stator components 2b to the holder 36, the polishing fixing agent 37 is heated to a temperature higher than room temperature and then, interposed between the stator components 2b and the holder 36 in the liquid state. The temperature of the polishing fixing agent 37 is returned to the room temperature to solidify.

The arrangement member 34 is not needed after the stator components 2b are fixed to the holder 36, and thus is removed from the stator components 2b.

Figure 1C:
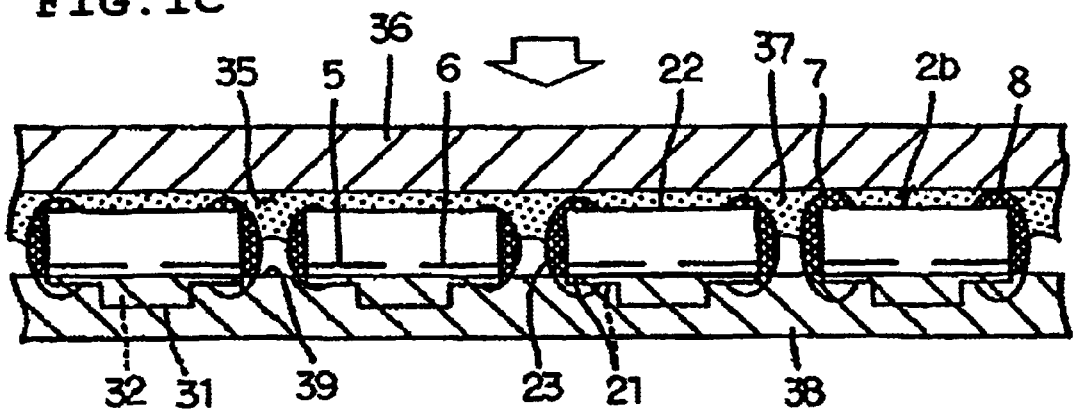

As shown in FIG. 1C, the first main surfaces 21 of the stator components 2b held by the holder 36 are polished by a polishing plate 38. The polishing removes not only the protruded portions 32 but also the portion of the conductive films defining the stator terminals 7 and 8 extending onto a portion of the first main surface.

A polishing plate 38 having a flat polishing surface 39, may be used instead of the arrangement member 34 shown in FIG. 1B. That is, the top surfaces 31 of the protruded portions 32 are brought into contact with the polishing surface 39 of the polishing plate 38. Thus, the stator components 2b are arranged such that the top surfaces 31 of the protruded portions 32 are arranged on the same plane. Then, the stator components 2b are fixed to the holder 36 via the polishing fixing agent 37. Then, the polishing plate 38 may be used to carry out the polishing.

Figure 1D:
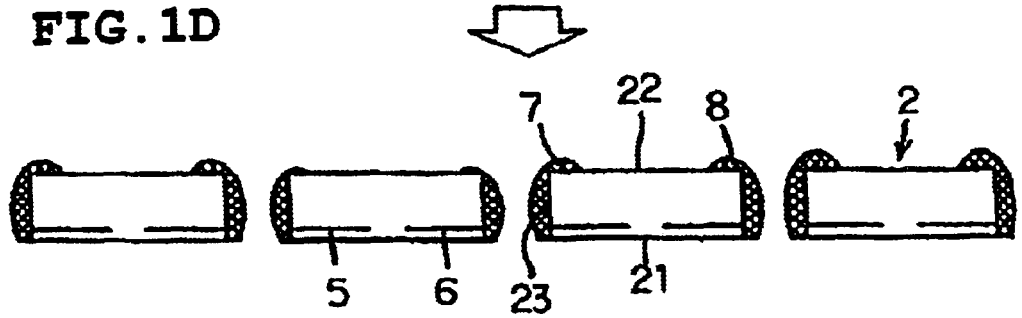

The stators 2 obtained by polishing the stator components 2b as described above are removed from the holder 36 as shown in FIG. 1D. At this time, the polishing fixing agent 37 is heated to a temperature higher than the liquefaction temperature, and then, the stator components 2b are separated from the holder 36, and simultaneously, the polishing fixing agent 37 adhered to the stator components 2b is removed therefrom. To eliminate the polishing fixing agent 37 adhered to the removed stator components 2b, cleaning with a solvent or other suitable cleaning agent, mechanical releasing, and other suitable methods may be applied in addition to the heating.

Since the polishing is carried out using the top surfaces 31 of the protruded portions 32 of the stator components 2b as a reference as described above, the stator components 2b having a substantially uniform polishing amount are obtained, not affected by differences in thickness between the conductive films defining the stator terminals 7 and 8 of the plural stator components 2b. Thus, in the stators 2 obtained after polishing, variations in thickness between the first main surfaces 21 and the stator electrodes 5 and 6 is greatly reduced.

Moreover, according to the polishing method illustrated in FIGS. 1A to 1D, even if there are differences in thickness between the stator terminals 7 and 8 of the respective stator components 2b, correct polishing is achieved, not affected by the above differences in thickness. This will be described in reference to FIGS. 3A and 3B.

Figure 3A:
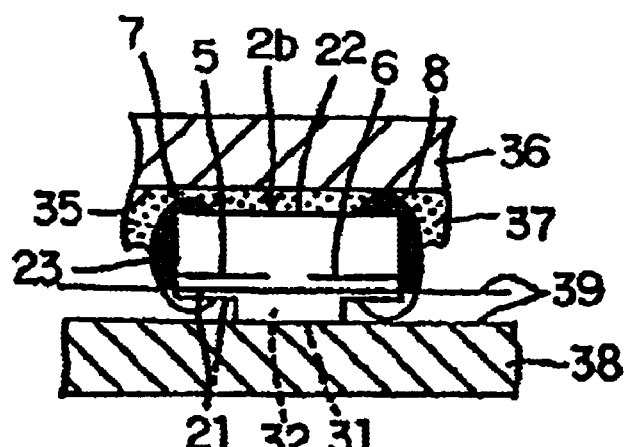
FIGS. 3A to 3B illustrate, in cross-section, the polishing of conductive films for stator terminals 7 and 8 of the stator portion 2b, carried out when the films have different thicknesses, according to the production method shown in FIGS. 1A to 1D.
Figure 3B:
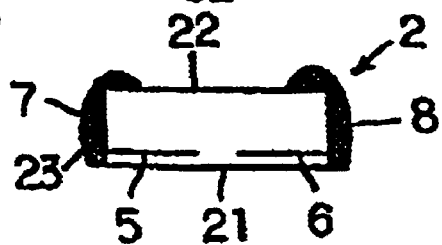

FIGS. 3A and 3B show a stator component 2b in which the conductive film defining the stator terminal 7 is thinner than that defining the stator terminal 8, and the resulting stator 2, respectively.

As shown in FIG. 3A, using the top surfaces 31 of the protruded portions 32 as a reference, the stator components 2b are fixed to the holder 36 through the polishing fixing agent 37, which is not inclined with respect to the polishing surface 39, even where there are variations in thickness of the stator terminals 7 and 8. Moreover, when the polishing is performed with the polishing plate 38, the polishing surface 39 is applied parallel to the stator electrodes 5 and 6.

Figure 8A:
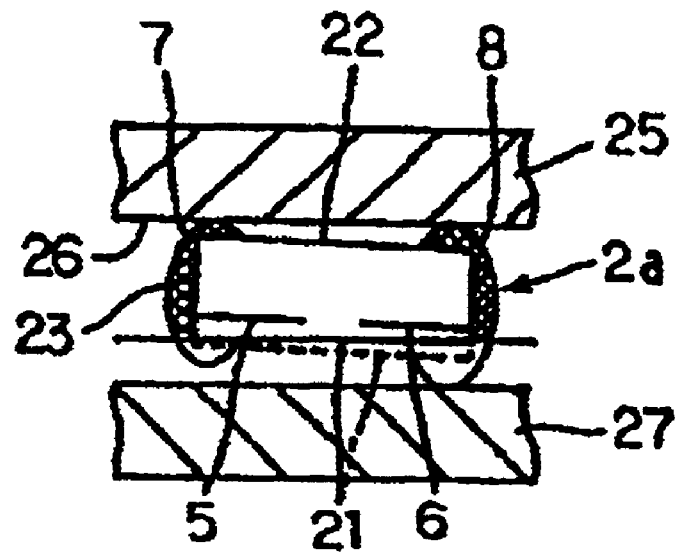
FIGS. 8A and 8B illustrate, in cross-section, polishing of the conductive films for stator terminals 7 and 8 of the stator portion 2b, carried out when the films have different thicknesses, according to the production method of FIGS. 7A to 7D.
Figure 8B:
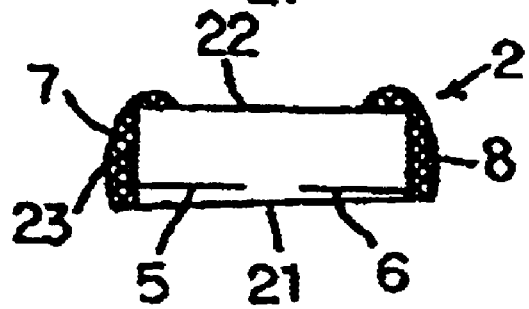

Accordingly, in the stator 2 obtained after the polishing, the first main surface 21 and the stator electrodes 5 and 6 are maintained parallel, as shown in FIG. 3B. In other words, the inappropriately polished state as shown in FIG. 8 is prevented.

Figure 4:
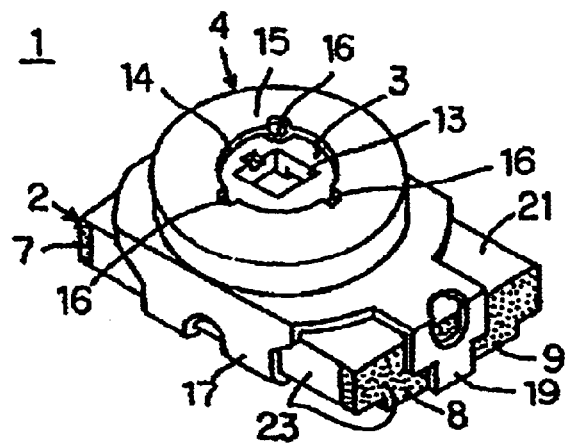
FIG. 4 is a perspective view showing the appearance of a variable capacitor 1.
Figure 5:
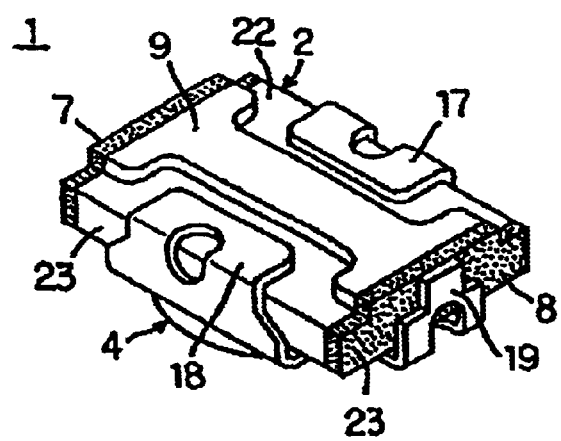
FIG. 5 is a perspective view seen from below the variable capacitor 1.
Figure 6:
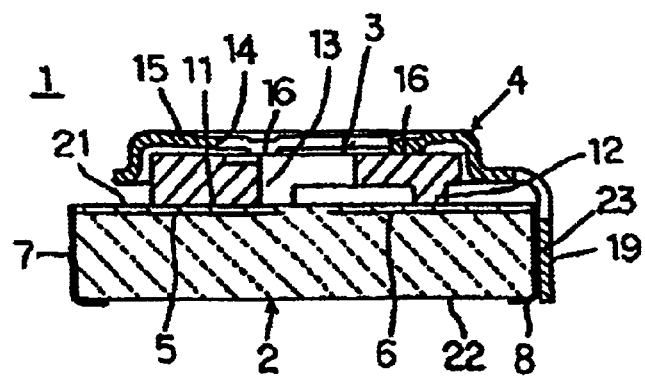
FIG. 6 is a cross-sectional view of the variable capacitor 1 shown in FIG. 4.
Figure 7A:
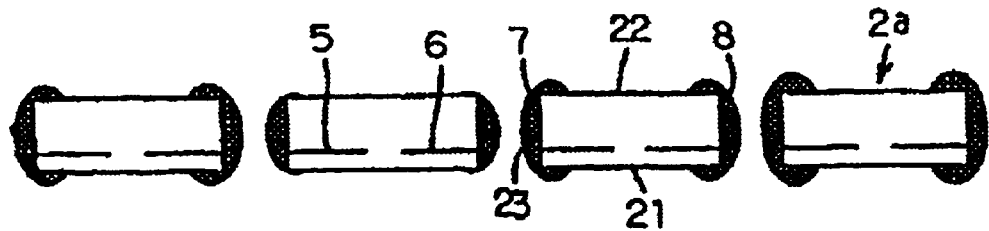
FIGS. 7A to 7D sequentially illustrate in cross-section, processes provided in a conventional method of producing a stator.
Figure 7B:
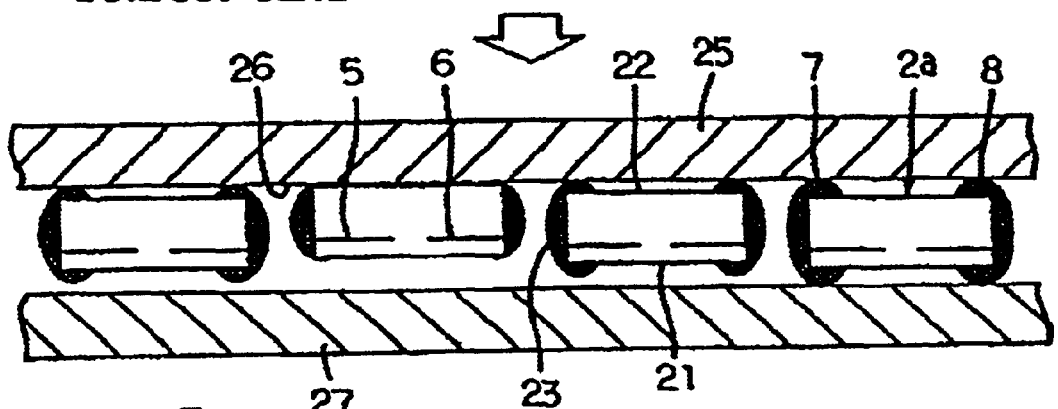
Figure 7C:
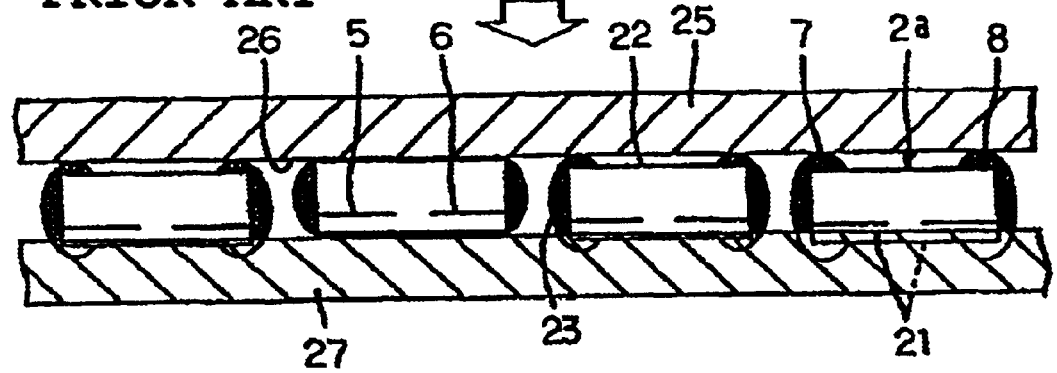
Figure 7D:
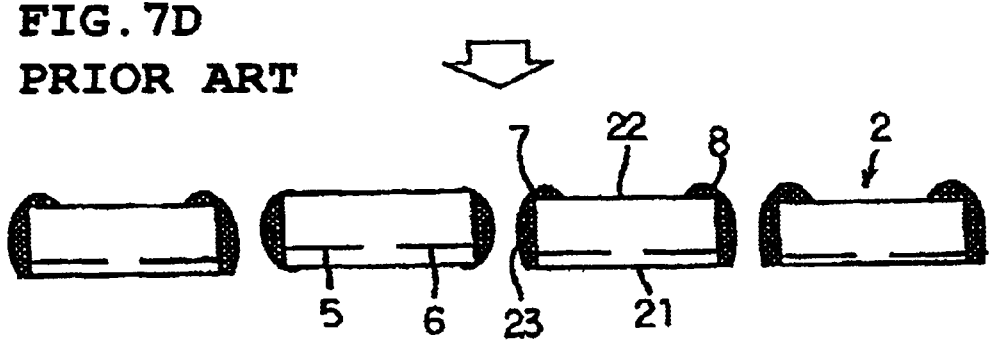

The stator 2 obtained in the above-described production method can be used in the variable capacitor 1 illustrated in FIG. 4 to 6. The structure of the variable capacitor 1 is the same as described above. The similar explanation is accordingly omitted.

Heretofore, the present invention has been described with reference to the drawings showing preferred embodiments thereof. In addition, some modifications may be made without departing from the scope of the present invention.

For example, in the above-described preferred embodiments, the stator components 2b are simultaneously processed and polished. The stator components 2b may be polished one by one, provided that the polishing is carried out using of the top surface 31 of the protruded portion 32 as a reference.

In the case in which the stator components 2b are simultaneously processed, the polishing fixing agent 37 is provided to fix the stator components 2b to the holder 36 in the shown preferred embodiments. However, for such purpose, the stator components 2b may be clipped by a mechanical device, and eliminating the polishing fixing agent 37.

Furthermore, in the shown preferred embodiments, in the stator 2, the stator electrodes 5 and 6 are provided inside of the dielectric member. The present invention may be applied to a method of producing a stator having stator electrodes provided on the outer surface thereof.

Moreover, in the shown preferred embodiments, the conductive films defining the stator terminals 7 and 8 are formed by applying and baking conductive paste. The present invention may be applied to stators in which the conductive films are formed by another method.

Furthermore, in the shown preferred embodiments, the stator 2 or the stator component 2b is provided with the two stator electrodes 5 and 6 and the two stator terminals 7 and 8. However, the present invention may be applied to a stator component having only one stator electrode and only one stator terminal. This corresponds to an extreme of the case of the stator component 2b and the stator 2 shown in FIGS. 3A and 3B, respectively. That is, in FIGS. 3A and 3B, even if the stator terminal 7 is not provided, appropriate polishing is achieved, provided that the top surface 31 of the protruded portion 32 is used as a reference.

As described above, in the stator component defining a stator to be produced, the stator terminal is preferably made of a conductive film that extends from the side surface onto a portion of the respective first and second main surfaces. On the first main surface, the protruded portion is provided which is different in height from the first main surface such that the top surface of the protruded portion has a height greater than the thickness of the conductive film. Regarding polishing of such a stator component, the first main surface side of the stator component is polished such that the portion of the conductive film extending on the portion of the first main surface is removed using the top surface of the protruded portion as a reference. Accordingly, even if there are variations in thickness between the conductive films defining the stator terminals in plural stator components or in each of the stator components, the portions of the conductive films defining the stator terminals and extending on the portion of the first main surface is completely removed, not affected by such variations in thickness. Moreover, the stator components are polished at a uniform polishing amount, eliminating an inclined polished-surface.

Accordingly, when a variable capacitor includes the stator produced in the production method of preferred embodiments of the present invention, the maximum static capacity of the variable capacitor is accurately and reliably obtained. Moreover, the rotation of the rotor is accurately and stably ensured. Thus, the adjustment operation of the static capacity and moreover, the adjusted static capacity is greatly improved.

According to preferred embodiments of the present invention, the polishing process is performed more efficiently when the polishing is performed with the stator components being held by the holder such that the top surfaces of the protruded portions are arranged on the same plane.

Preferably, when the stator components are held by the holder, the arrangement member having a flat arrangement surface and the polishing fixing agent are prepared, and the stator components are arranged via the arrangement member with the respective top surfaces of the protruded portions being in contact with the arrangement surface of the arrangement member, and the second main surface sides of the stator components are fixed to the holder via the polishing fixing agent. Thereby, the stator components are efficiently held such that the top surfaces of the protruded portions are arranged on the same plane.

Furthermore, when the stator obtained in the production method of preferred embodiments of the present invention includes a stator electrode provided inside of the dielectric member, extremely high precision polishing is required, and the production method of preferred embodiments of the present invention produces greatly improved polishing precision.

Moreover, when the stator terminals are formed by applying conductive paste and then baking the paste, variations in thickness of the conductive films often occur. Thus, the polishing method of preferred embodiments of the present invention is very advantageous.

While the invention has been particularly shown and described with reference to preferred embodiments thereof, it will be understood by those skilled in the art that the foregoing and other changes in form and details can be made without departing from the spirit and scope of the invention.

What is claimed is:

1. A method of producing a stator for use in a variable capacitor, the method comprising the steps of:

preparing the stator for use in the variable capacitor which is made of a dielectric, having first and second main surfaces which are substantially parallel to each other, and a side surface connecting both of the first and second main surfaces, said stator having a stator electrode extending substantially parallel to the first and second main surfaces, and a stator terminal provided on at least a portion of the side surface to be electrically connected to the stator electrode;

providing a stator component which defines the stator and is provided with the stator electrode and the stator terminal, said stator terminal being made of a conductive film and extending from the side surface onto a portion of the respective first and second main surfaces, and a protruded portion being provided on the first main surface where the conductive film defining the stator terminal is not provided, said protruded portion being provided such that a height of the top surface of the protruded portion is greater than a thickness of the conductive film; and polishing the first main surface of the stator component having the top surface of the protruded portion as a reference to remove the portion of the conductive film extending on the first main surface.

2. A method according to claim 1, wherein the step of polishing includes the steps of:

holding a plurality of the stator components with a holder to arrange the top surfaces of the protruded portions in the same plane; and polishing the first main surface of the plurality of stator components while the plurality of stator components are held by the holder.

3. A method according to claim 2, wherein the step of holding the plurality of stator components by the holder includes the steps of:

providing an arrangement member having a flat arrangement surface;

arranging the plurality of stator components with the arrangement member with the top surfaces of the protruded portions being in contact with the arrangement surface of the arrangement member;

providing a polishing fixing agent to fix the plurality of stator components to the holder; and fixing the second main surfaces of the plurality of stator components arranged with the arrangement member to the holder through the polishing fixing agent.

4. A method according to claim 3, wherein said arrangement member is defined by a polishing member.

5. A method according to claim 1, wherein the stator has the stator electrode formed inside of the dielectric.

6. A method according to claim 1, wherein in the step of providing the stator component, the conductive film is formed by applying conductive paste to extend from the side surface onto a portion of the respective first and second main surfaces, and baking the paste.

7. A method according to claim 1, wherein said stator component is made of a ceramic dielectric.

8. A method of producing a stator for use in a variable capacitor, the method comprising the steps of:

providing a stator component having first and second main surfaces which are substantially parallel to each other, and a side surface connecting both of the first and second main surfaces, a stator electrode extending substantially parallel to the first and second main surfaces, and at least one stator terminal, said at least one stator terminal being made of a conductive film and extending from the side surface onto a portion of the respective first and second main surfaces, and a protruded portion being provided on the first main surface where the conductive film defining the at least one stator terminal is not provided, said protruded portion being arranged such that the height of the top surface of the protruded portion is greater than the thickness of the conductive film; and polishing the first main surface of the stator component having the top surface of the protruded portion as a reference to remove the portion of the conductive film extending on the first main surface.

9. A method according to claim 8, wherein said stator component is made of a dielectric.

10. A method according to claim 8, wherein the step of polishing includes the steps of:

holding a plurality of the stator components with a holder to arrange the top surfaces of the protruded portions in the same plane; and polishing the first main surface of the plurality of stator components while the plurality of stator components are held by the holder.

11. A method according to claim 10, wherein the step of holding the plurality of stator components by the holder includes the steps of:

providing an arrangement member having a flat arrangement surface;

arranging the plurality of stator components with the arrangement member with the top surfaces of the protruded portions being in contact with the arrangement surface of the arrangement member;

providing a polishing fixing agent to fix the plurality of stator components to the holder; and fixing the second main surfaces of the plurality of stator components arranged with the arrangement member to the holder through the polishing fixing agent.

12. A method according to claim 11, wherein said arrangement member is defined by a polishing member.

13. A method according to claim 8, wherein the stator has the stator electrode formed inside of the dielectric.

14. A method according to claim 8, wherein in the step of providing the stator component, the conductive film is formed by applying conductive paste to extend from the side surface onto a portion of the respective first and second main surfaces, and baking the paste.

15. A method according to claim 8, wherein said stator component is made of a ceramic dielectric.

* * * * *